March 31, 1964  W. N. POUNDSTONE  3,127,203
SHEAVE AND ROLLER ASSEMBLIES

Filed June 30, 1960  2 Sheets-Sheet 1

INVENTOR.
WILLIAM N. POUNDSTONE
BY *Stanley J. Price*
his ATTORNEY

INVENTOR.
WILLIAM N. POUNDSTONE
BY Stanley J. Price
his ATTORNEY

United States Patent Office 3,127,203
Patented Mar. 31, 1964

3,127,203
SHEAVE AND ROLLER ASSEMBLIES
William N. Poundstone, Morgantown, W. Va., assignor to Consolidation Coal Company, Pittsburgh, Pa., a corporation of Pennsylvania
Filed June 30, 1960, Ser. No. 39,985
2 Claims. (Cl. 287—52.07)

This invention relates to sheave and roller assemblies and more particularly to sheave and roller assemblies having flexible resilient connecting means between the outer cylindrical portions and shafts extending therethrough.

This application is a continuation-in-part of my copending U.S. patent application Serial No. 766,253 filed October 9, 1958 and now abandoned.

An object of this invention is to provide a sheave assembly having a flexible resilient means frictionally securing the sheave hub portion to the shaft extending therethrough.

Another object of this invention is to provide a sheave assembly wherein the flexible resilient connecting means between the sheave hub portion and the shaft includes a pair of annular ring portions adjacent the shaft and operable to be urged toward said shaft to thereby frictionally engage the same to the sheave hub portion.

A further object of this invention is to provide a sheave assembly having a flexible resilient bushing positioned between the sheave hub portion and the shaft extending therethrough and a means to compress the resilient bushing to frictionally engage the shaft to the sheave hub portion.

Another object of this invention is to provide a roller assembly having a tubular roller member nonrotatably secured to a shaft extending therethrough by flexible resilient bushings positioned between the roller member and the shaft.

Another object of this invention is to provide an improved roller assembly particularly adapted to serve as a tail piece turn-around roller for an endless belt conveyor.

A further object of this invention is to provide sheave and roller assemblies that are simple and economical to manufacture, sturdy in construction and easily assembled.

These and other objects and advantages of this invention will be more completely disclosed and described in the following specification, the accompanying drawings and the appended claims.

In the accompanying drawings, to be taken as part of this specification, I have fully and clearly illustrated my invention, in which drawings.

Figure 1:
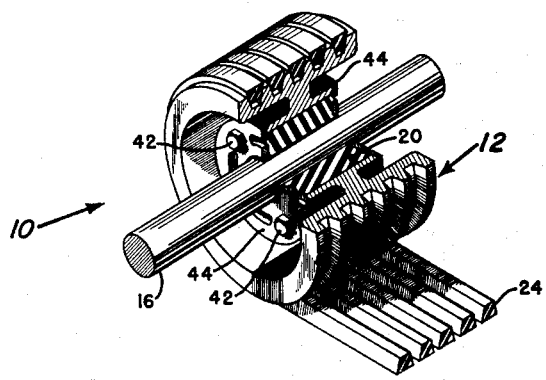
FIGURE 1 is a perspective view of my sheave assembly with portions cut away to illustrate the flexible resilient bushing.
Figures 2, 3:
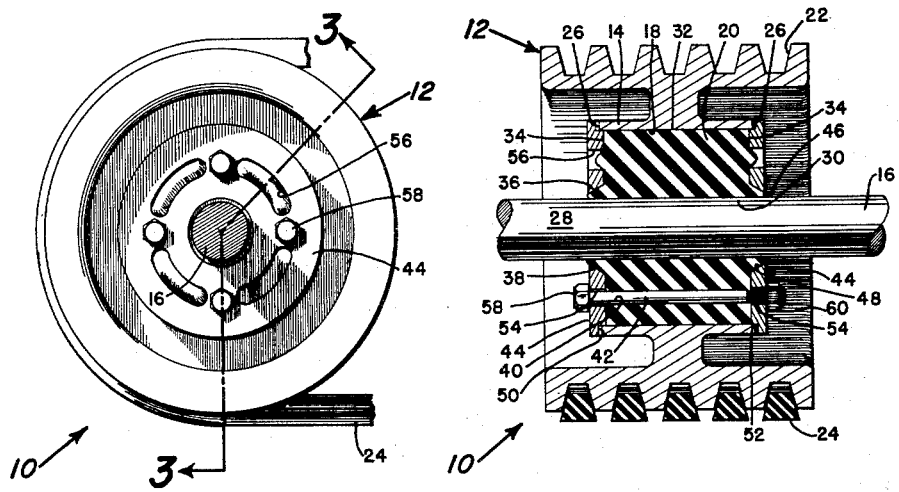
FIGURE 2 is a view in end elevation of the sheave assembly illustrated in FIGURE 1.
FIGURE 3 is a view in section taken along line 3—3 of FIGURE 2.

In FIGURES 1, 2 and 3 there is shown a sheave assembly 10 having a wheel or pulley 12 with a hub portion 14. A shaft 16 extends through the bore 18 in the hub portion 14 and is coaxially secured therein by a flexible resilient bushing 20.

The pulley 12 has a plurality of peripheral grooves 22 which receive and frictionally engage V belts 24. Although the embodiment illustrated in FIGURES 1, 2 and 3 relates to a V belt type sheave, it should be understood that the invention is not limited thereto and may be employed in other types of flexible couplings as, for example, shown in FIGURE 4 wherein there is a first rigid member having an internal bore and a second rigid member having an outer cylindrical surface.

Referring in detail to the wheel or pulley 12 the hub portion 14 has a bore 18 therethrough and annular end walls 26. The bore 18 is peripherally cylindrical in shape and has a shaft 16 coaxially positioned therein. The shaft 16 has an external cylindrical surface 28 and is maintained in coaxial relation with the hub 14 by means of the flexible resilient bushing 20.

The bushing 20 has an internal bore 30 with a substantially cylindrical surface and an outer cylindrical surface 32. The outer diameter of the bushing 20 is substantially equal to the diameter of the hub bore 18 so that the bushing 20 may be inserted therein. The bushing bore 30 has a diameter slightly greater than the diameter of the shaft 16 so that in assembling, the shaft may be easily inserted in the bushing bore 30.

The bushing 20 has a pair of end walls 34 and a longitudinal dimension slightly greater than the longitudinal dimension of the hub 14. With this construction when the bushing 20 is positioned within the hub 14 the bushing end walls 34 extend beyond the hub end walls 26.

Each of the bushing end walls 34 has an annular ring portion 36 formed thereon adjacent the bushing bore 30. The ring members 36 extend outwardly beyond the end walls 34 and have an inner diameter substantially equal to the inner diameter of the bushing bore 30. The rings 36 have an outer tapered surface 38 which is frusto conical in shape and increases in diameter toward the bushing end walls 34. A plurality of longitudinal passageways 40 extend through the bushing 20 in spaced radial relation with the bushing bore 30 and are adapted to receive bolts 42.

A pair of rigid annular end plates 44 have an outer diameter greater than the diameter of the hub bore 18 and a central aperture 46 which forms an inner wall 48. The wall 48 is tapered and frusto conical in shape and substantially conforms to the shape of the bushing ring outer surface 38. Each of the end plates 44 has a circular shoulder portion 50 adjacent the plate peripheral edge portion. The shoulder portion has a surface 52 extending parallel to the hub bore 18 and has a diameter substantially equal to that of the hub bore 18. The end plates 44 have a plurality of apertures 54 in spaced radial relation to the central aperture 46 and a plurality of slots 56 which are spaced substantially equidistant between the central aperture 46 and the shoulder portion 50. The slots 56 are also spaced between the plate apertures 54.

The sheave assembly 10 may be assembled as follows. The bushing 20 is positioned within the sheave hub bore 18 so that the bushing end walls 34 extend outwardly beyond the hub end walls 26. The shaft 28 is then positioned within the bushing bore 30 as illustrated in FIGURES 1 and 3. End plates 44 are positioned with the shaft 16 extending through the end plate central aperture 46 and the end plate inner surfaces abutting the bushing end walls 34. Bolts 42 are then inserted through the aligned end plate apertures 54 and the bushing passageways 40. The bolts 42 have an enlarged head portion 58 which abuts the outer surface of one end plate and a nut 60 is threadedly secured to the other end of the bolt 42 and abuts the outer surface of the other end plate. The nuts 60 are then tightened on the bolts 42 to urge end plates 44 toward each other. The end plate inner tapered wall 48 conforms in contour to the bushing ring outer surface 36 and abuts the same. The end plates 44 are urged toward each other until the plate shoulder portion 50 abuts the hub end walls 26. The shoulder surface 52 readily slides on the hub inner surface or bore 32 and is guided thereon. The bushing 20 is formed of a flexible resilient material such as rubber or the like and is readily deformable and as it is compressed between the end plates 44 the diameter of the bore 30 decreases until the bushing 20 frictionally engages the shaft outer surface 28. Also the bushing outer surface frictionally engages the hub bore 18. The slots 56 provide a means for portions of the bushing end walls 34 to extrude therefrom and the tapered or frusto conically shaped bushing annular rings provide a tapered surface along which the end plate central aperture inner wall moves and literally clamps the bushing 20 to the shaft 16.

Figure 4:
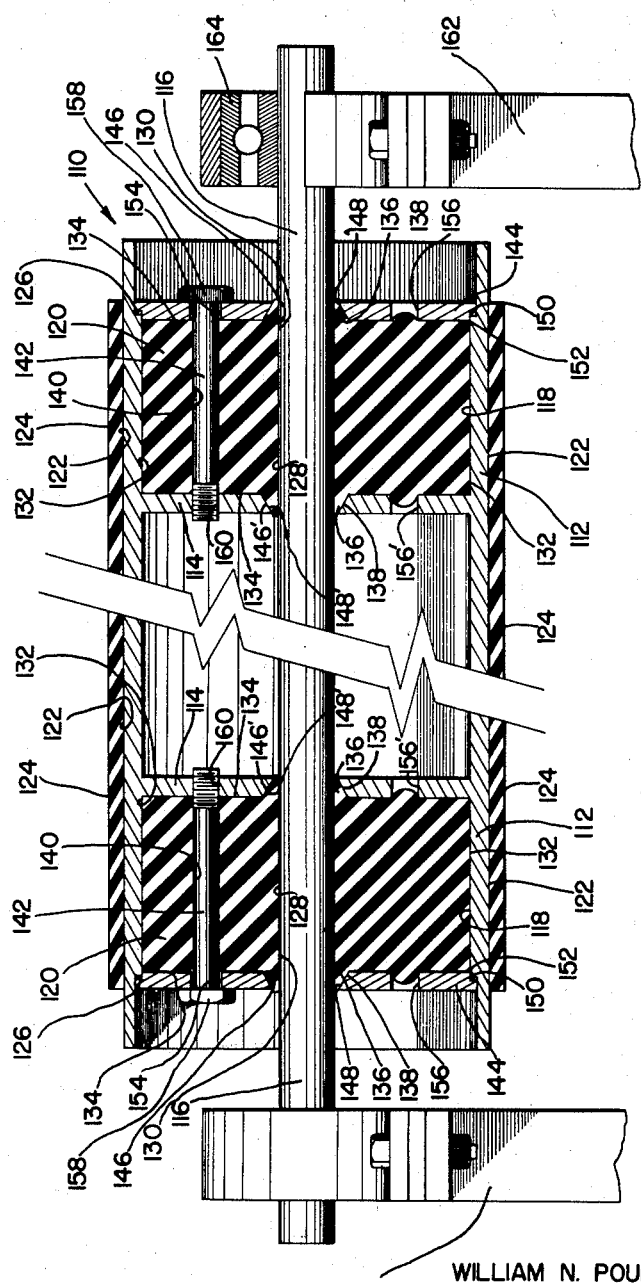
FIGURE 4 is a longitudinal sectional view, similar to FIGURE 3, of a roller assembly built in accordance with the present invention.

In FIGURE 4 there is shown a roller assembly 110 having a tubular roller member 112 with inwardly extending, axially spaced annular end wall portions 114. A shaft 116 extends coaxially through roller member 112 in spaced relation to the cylindrical internal surface 118 of roller member 112. The shaft 116 is coaxially secured within roller member 112 by a pair of flexible resilient bushings 120.

The roller member 112 has a cylindrical external surface 122 which frictionally engages an endless conveyor belt 124. The embodiment of the invention illustrated in FIGURE 4 is particularly adapted to be utilized as a tail piece turn-around roller on an endless belt conveyor. These turn-around rollers are located at the entry end of a belt conveyor and serve to guide the return reach of a conveyor belt, which is the empty belt portion of the endless conveyor belt, around the periphery of the roller and allow the conveyor belt to change direction and move on its conveying reach run, which is the belt portion that carries material to be conveyed. The belt conveyor turn-around rollers are nonrotatably fixed to shafts that are journalled for rotation in external supports such as pillow blocks.

Referring in detail to the roller member 112, the axially spaced end wall portions 114 are located adjacent the respective end portions of the roller member 112. Roller member 112 is constructed so that its length exceeds the width of the conveyor belt to be supported and guided by it. Axially outwardly of each end wall portion 114, the cylindrical internal surface 118 of roller member 112 has a radially extending annular shoulder portion 126 formed therein. The shaft 116, positioned coaxially within roller member 112, has an external cylindrical surface 128 and is maintained in coaxial relation with the tubular roller 112 by means of the flexible resilient bushings 120.

Each bushing 120 has an internal bore 130 with a substantially cylindrical surface and an outer cylindrical surface 132. The outer diameter of each bushing 120 is substantially equal to the diameter of the cylindrical internal surface 118 of roller member 112 so that the bushings 120 may be inserted therein. Each bushing bore 130 has a diameter slightly greater than the diameter of shaft 116 so that in assembly, the shaft may be easily inserted in the bushing bores.

Each bushing 120 has a pair of end walls 134 and a longitudinal dimension slightly greater than the axial dimension of roller member 112 from each annular end wall portion 114 to the adjacent axially outwardly located annular shoulder portion 126. With this construction, when the bushings 120 are positioned within the roller member 112 with one end wall 134 abutting the roller member end wall portion 114, the other end walls 134 of bushings 120 extend axially beyond the roller member shoulder portions 126.

Each bushing end wall 134 has an annular ring portion 136 formed thereon adjacent the bushing bores 130. The rings 136 have an outer tapered surface 138 which is frusto-conical in shape and increases in diameter toward the bushing end walls 134. A plurality of longitudinal passageways 140 extend through the bushings 120 in spaced radial relation with the bushing bores 130 and are adapted to receive bolts 142.

A pair of rigid annular end plates 144 have an outer diameter greater than the diameter of the cylindrical internal surface 118 of roller member 112 and a central aperture 146 which forms an inner wall 148. The wall 148 is tapered and frusto conical in shape and substantially conforms to the shape of the bushing ring outer surface 138. Each inwardly extending annular end wall portion 114 of roller member 112 has a central aperture 146' which forms an inner wall 148' similar to walls 148 of the end plates 144. The walls 148' are tapered and frusto conical in shape and substantially conform to the shape of the bushing ring outer surfaces 138.

Each end plate 144 has a circular shoulder portion 150 adjacent the plate peripheral edge portion. The shoulder portion has a surface 152 extending parallel to the cylindrical internal surface 118 of roller member 112 and has a diameter substantially equal to that of the cylindrical internal surface 118. The end plates 144 have a plurality of apertures 154 in spaced radial relation to the central aperture 146 and a plurality of slots 156 which are spaced substantially equidistantly between the central aperture 146 and the shoulder portion 150. The slots 156 are also spaced between the plate apertures 154.

The inwardly extending end wall portions 114 of roller member 112 have a plurality of threaded apertures 160 in spaced radial relation to the central aperture 146' and axially aligned with apertures 154 in end plates 144. The end wall portions 114 also have a plurality of slots 156' which are spaced substantially equidistantly between the central aperture 146' and the cylindrical internal surface 118 of roller member 112. The slots 156 and 156' of FIGURE 4 are similar to the slots 56 of FIGURES 1, 2 and 3 and are located in the same manner as slots 56 as best seen in FIGURE 3.

The roller assembly 110 may be assembled as follows. A bushing 120 is positioned within each end of tubular member 112 so that one end wall 134 of each bushing abuts an annular end wall portion 114 of the roller member 112 and so that the other end wall 134 of each bushing extends axially outwardly beyond the annular shoulder portion 126 of roller member 112. The shaft 128 is then positioned within the bushing bores 130 as illustrated in FIGURE 4. End plates 144 are positioned at each end of roller member 112 with the shaft 116 extending through the end plate central apertures 146 and the end plate inner surfaces abutting the bushing end walls 134. Bolts 142 are then inserted through the aligned end plate apertures 154 and the bushing passageways 140. The bolts 142 have an enlarged head portion 158 which abuts the outer surface of the end plates 144. The bolts 142 pass freely through end plate apertures 154 and are threaded into the threaded apertures 160 formed in roller member end wall portions 114.

The bolts are then tightened into apertures 160 to urge each end plate 144 toward its respective roller member end wall portion 114. The end plate inner tapered walls 148 and the roller member end wall portion inner tapered walls 148' conform in contour to the bushing ring outer surfaces 136 and abut the same. The end plates 144 are urged toward their respective end wall portions 114 until the shoulder portions 150 abut the shoulder portion 126 of roller member 112. The shoulder surface 152 readily slides on the cylindrical internal surface 118 of roller member 112 and is guided thereon. The bushings 120 are formed of a flexible resilient material such as rubber or the like and are readily deformable and as they are deformed between the end plates 144 and the end wall portions 114, the diameters of the bores 130 decrease until each bushing 120 frictionally engages the shaft outer surface 128. Also, each bushing outer surface frictionally engages the cylindrical internal surface 118 of roller member 112. The slots 156 and 156' provide a means for portions of the bushing end walls 134 to extrude therefrom and the tapered or frusto-conically shaped bushing annular rings provide a tapered surface along which the end plate central aperture inner wall moves and literally clamps the bushing 120 to the shaft 116.

Once assembled, the roller assembly 110 may be rotatably supported by pillow blocks 162 at each end of shaft 116. In conventional fashion, the pillow blocks 162 have bearing assemblies 164 therein which support shaft 116 and permit it to rotate relative to the fixed pillow blocks 162. If the roller assembly of FIGURE 4 is utilized as a belt conveyor tail piece turn around roller, the pillow blocks 162 will be rigidly fixed to the conveyor tail piece.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. A roller assembly comprising in combination a tubular roller member with an internal cylindrical surface and a pair of end wall portions extending radially inwardly from said internal cylindrical surface adjacent the ends of said roller member, said roller member having an adjacent annular shoulder formed axially outwardly of each end wall portion, a shaft having an external cylindrical surface with a diameter less than the diameter of said roller member cylindrical internal surface, a pair of cylindrical bushings of flexible resilient material each having a bore therethrough and an outer diameter substantially equal to the diameter of said roller member cylindrical internal surface and an inner diameter greater than the diameter of said shaft, each of said bushings having a pair of end walls and a longitudinal dimension greater than the longitudinal dimension from one of said roller member end wall portions to an adjacent axially outwardly located annular shoulder formed in said roller member, said bushing end walls each having a frustoconical annular ring portion extending outwardly therefrom, said ring portions each having an inner cylindrical wall substantially the same diameter as said bushing inner diameter and an outer sloping wall increasing in diameter toward said respective bushing end wall, a pair of rigid annular end plates having an outer diameter greater than the diameter of said roller member cylindrical internal surface and an aperture forming an inner frustoconical wall with a diameter greater than the diameter of said shaft, said end plates each having a plurality of slotted portions therethrough, each of said bushings being positioned within said roller member and each having an end wall abutting a roller member end wall and each with an end wall extending beyond a roller member annular shoulder, said shaft extending through each of said bushing bores, said end plates being positioned coaxially on said shaft, each of said end plates being in abutting relation with a bushing end wall extending beyond said roller member annular shoulders with said inner frustoconical wall abutting said respective ring portion outer sloping wall, and means to urge said rigid end plates toward said respective roller member end wall portions to thereby exert an axial compressive force on said resilient bushings to distort said bushings and to frictionally engage said roller member to said shaft, said cylindrical bushing being adapted, upon distortion by said end plates, to have said ring portions extrude between each of said respective end plate inner frusto-conical walls and said shaft outer cylindrical surface, and portions of said bushing extrude into said respective end plate slotted portions.

2. A roller assembly comprising in combination a tubular roller member with an internal cylindrical surface and a pair of end wall portions extending radially inwardly from said internal cylindrical surface adjacent the ends of said roller member, said roller member having an adjacent annular shoulder formed axially outwardly of each end wall portion, a shaft having an external cylindrical surface with a diameter less than the diameter of said roller member cylindrical internal surface, a pair of cylindrical bushings of resilient material each having a bore therethrough and an outer diameter substantially equal to the diameter of said roller member cylindrical internal surface and an inner diameter greater than the diameter of said shaft, each of said bushings having a pair of end walls and a longitudinal dimension greater than the longitudinal dimension from one of said roller member end wall portions to an adjacent axially outwardly located annular shoulder formed in said roller member, said bushing end walls each having a frustoconical annular ring portion extending outwardly therefrom, said ring portions each having an inner cylindrical wall substantially the same diameter as said bushing inner diameter and an outer sloping wall increasing in diameter toward said respective bushing end wall, said bushings each having a plurality of longitudinal passageways therethrough in radial spaced relation with said bushing bore, a pair of rigid annular end plates having an outer diameter greater than the diameter of said roller member cylindrical internal surface and a central aperture forming an inner frusto-conical wall with a diameter greater than the diameter of said shaft, each of said annular plates having a circular shoulder portion adjacent their plate peripheral edge portion, said shoulder portion having a diameter substantially equal to the diameter of said roller member cylindrical internal surface, said plates each having a plurality of other apertures in radial spaced relation with said central aperture, said plates each having a plurality of slots therethrough in spaced relation to said plate apertures, said roller member end wall portions having a plurality of threaded apertures formed therein and a plurality of slots therethrough, each of said bushings being positioned within said roller member with said bushing end walls abutting said roller member end wall portions and the other bushing end walls extending beyond said roller member annular shoulders, said shaft extending through each of said bushing bores, said end plates being positioned coaxially on said shaft, each of said end plates being in abutting relation with a bushing end wall extending beyond a roller member annular shoulder with a respective frusto-conical inner wall abutting a bushing ring outer sloping wall, each of said plate shoulder portions facing a respective adjacent roller member annular shoulder with said plate other apertures aligned with said bushing longitudinal passageways and said respective roller member end wall portion threaded apertures, a plurality of bolts having an enlarged head portion and a threaded other end portion extending through said aligned plate apertures and said bushing passageways with said head portions abutting said end plate outer surfaces, said bolt threaded end portions threadedly secured within said roller member end wall portion threaded apertures to move said end plates toward said respective roller member end wall portions to exert an axial compressive force on said bushing until each of said plate shoulder portions abut said adjacent roller member annular shoulders and portions of said bushing extrude through said plate slots and said end wall portion slots and adjacent said shaft to thereby frictionally engage said shaft to said hub portion.

References Cited in the file of this patent

UNITED STATES PATENTS

| | | |
|---|---|---|
| 212,257 | Norris | Feb. 11, 1879 |
| 2,171,157 | Mathews | Aug. 29, 1939 |
| 2,484,752 | Searles | Oct. 11, 1949 |
| 2,522,350 | Ditter | Sept. 12, 1950 |
| 2,771,502 | King et al. | Nov. 20, 1956 |